UNITED STATES PATENT OFFICE.

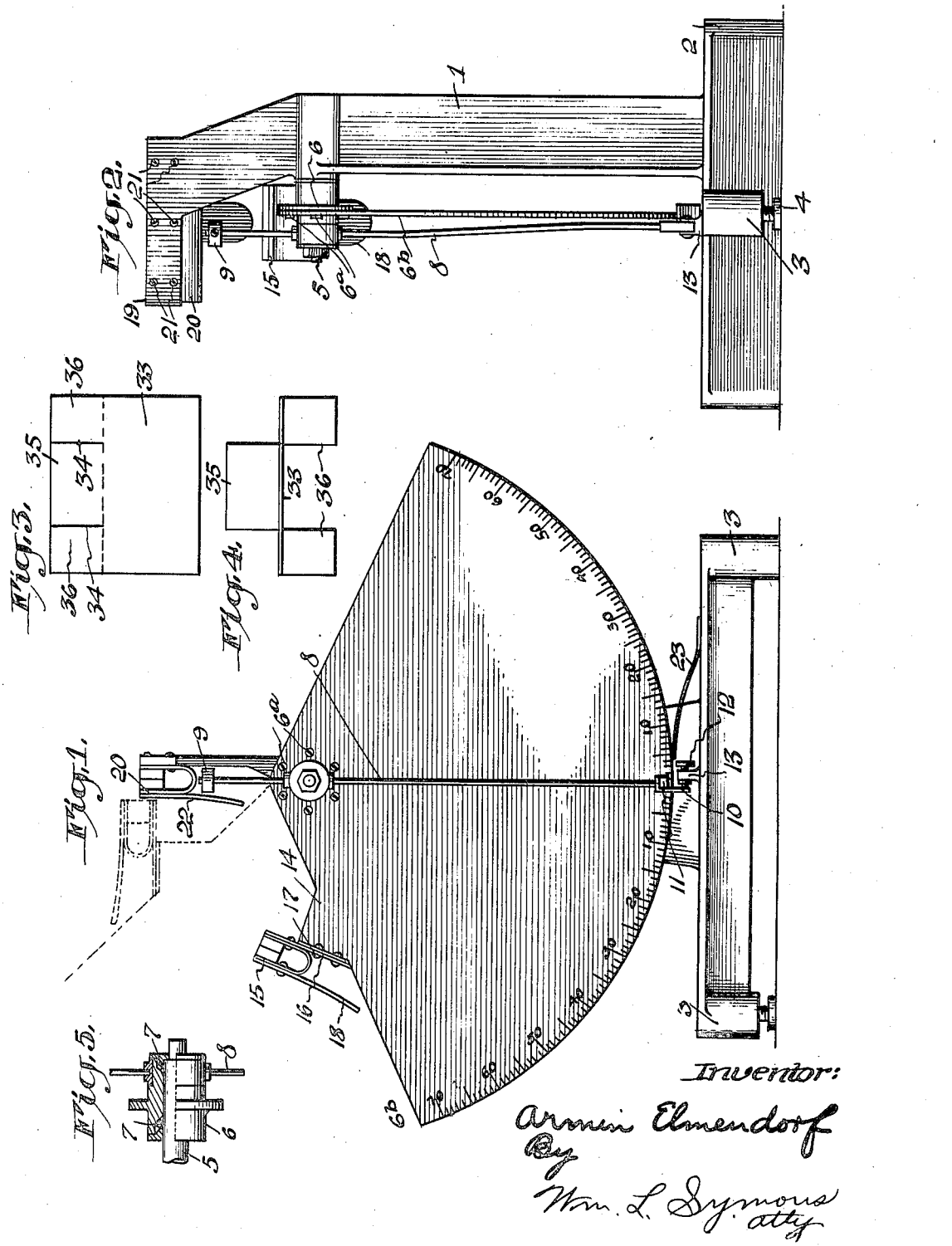

ARMIN ELMENDORF, OF CHICAGO, ILLINOIS.

TEARING TESTER.

1,423,842.    Specification of Letters Patent.    Patented July 25, 1922.

Continuation of application Serial No. 356,078, filed February 3, 1920. This application filed August 31, 1920. Serial No. 407,165.

*To all whom it may concern:*

Be it known that I, ARMIN ELMENDORF, a citizen of the United States of America, residing at Chicago, in the county of Cook and State of Illinois, have invented certain new and useful Improvements in Tearing Testers, of which the following is a specification.

This invention relates to a device for the purpose of testing the tearing strength of paper, fabrics, rubber, leather, cords, and other materials.

An object of my invention is the construction of a device to measure the tearing strength of materials by determining the work necessary to accomplish the tearing. My device, instead of measuring the tearing force directly, which method has been found to be unreliable because of the non-uniform structure of the materials acted upon, measures the work done in tearing the material.

A further object of my invention is to utilize a calibrated pendulum having thereon means to grip a specimen of the material to be tested.

A further object of my invention is the production of a device consisting of a few simple parts, which results in a machine which does not easily get out of order and is readily repaired if any of the parts become worn or broken.

With my invention I use a certain sized specimen of the material to be tested. This enables me to make calculations by which the strength of the material can be accurately determined.

This application is a continuation of an application filed February 3, 1920, Serial No. 356,078.

In order to accomplish these and other objects, I have embodied my invention in a form of the device which is illustrated in the accompanying drawings, in which:

Figure 1 is a front elevation of my device;
Figure 2 is a side elevation thereof;
Figure 3 is a plan view of the material to be tested shown cut but not folded;
Figure 4 is an edge view of the material with the cut parts folded at right angles to the uncut parts, and
Figure 5 is a half section through the hub of the pendulum.

Referring to the drawings, a frame 1 has a base 2 which is supported on legs 3. One of said legs has screw means 4 to enable the device to be placed in a horizontal position. An axle 5 in the upper part of the frame has mounted thereon a hub 6 to which is attached by means of bolts or rivets $6^a$, a pendulum $6^b$. The hub and pendulum may, of course, be integral. This pendulum may be mounted on the shaft by roller bearings 7. The pendulum $6^b$ may be of any desired form, but as shown it consists of a thin plate having the general outline of a sector which is approximately five-twelfths the area of a circle. The arc of this sector is calibrated from zero to seventy degrees each way.

Mounted frictionally on the hub of the pendulum is a pointer 8, having at the upper end thereof a balancing knob 9, and at the lower end thereof a right-angled extension 10 by means of which the pointer may be set so that the "scratch" 11 registers with zero on the pendulum. It will be understood that zero is placed on the circumference of the pendulum so that a vertical line will pass through zero and the center of the axle. This registration is accomplished by means of a screw 12 extending through a standard 13 on the base 2 and coming in contact with the right-angled extension 10 on the end of the pointer 8.

Attached to a triangular extension 14 on the edge of the pendulum is a spring clamp 15 which cooperates with a second spring clamp to hold the specimen to be tested. An arm 16 of this clamp is attached to the pendulum by means of rivets 17, or in any other suitable way. A handle 18 is used to open the clamp in order to insert the specimen of material. Attached to the arm 19 of the frame 1 is a second spring clamp 20. This second clamp is attached by rivets or screws 21 and is operated by means of a handle 22.

The specimen of material 33 to be tested is cut as indicated at 34. The part 35 is attached to the clamp on the pendulum, while the parts 36 are attached to the clamp on the upper arm of the frame. The specimens may be of any desired suitable, definite size. I have shown in this application and have made my calculations based on a specimen which is two inches in width measuring from the ends of the cuts.

A spring 23, one end of which is attached to the base, has the free end thereof pressed against the circumference of the pendulum. The force of this spring is such that it will hold the pendulum or retard the swinging so as to bring it to a stop after the specimen has been torn and the pendulum is beginning the return swing. In addition to dampening the vibrations after the specimen has been torn, the spring holds the pendulum in the farthest position while the specimen is being gripped.

The operation of my device may be described as follows: The pendulum which was at rest and registers zero when hanging freely, is swung to the left until the edge passes the end of the spring 23 which then springs up and engages the end of the radial edge of the pendulum. The specimen is then inserted so that the lips are held by the respective clamps. This done the machine is ready to make the tear. The spring 23 is pressed down with a finger and held so as to clear the circular edge of the pendulum until the specimen has been torn and the pendulum has begun the return swing when it is allowed to spring up to dampen the vibrations, and stop the swinging. The machine is so designed that the line through the center of gravity of the pendulum and the axis of rotation rotates through an angle of 70 degrees when the pendulum is swung to the left to its starting position. This angle will be spoken of as the initial angle. Other initial angles both greater and less than 70 degrees may be used with equal satisfaction. It is only necessary to increase the size of the pendulum to effect such a change. As the pendulum is completing the tearing swing the pointer 8 is pushed around by the stop screw 12 until the end of the swing when it recedes with the pendulum and records the maximum angle the pendulum made to the right of the vertical. The slight friction at the hub where it is attached holds the pointer in a fixed position relative to the pendulum until such a time as the operator reads the angle. This angle will be referred to as the final angle.

In computing the work done in tearing the specimen I will denote the initial angle by $e_1$ and the final angle by $e_2$. If W represents the weight of the pendulum and $d$ the distance from the axis of rotation to the center of gravity of the pendulum then the work done in tearing is given by the expression $Wd(\cos e_2 - \cos e_1)$. Dividing by the length of the tear, which is 2 inches in the machine illustrated, gives the average tearing force.

The arm of the pendulum is readily calibrated so that the average tearing force is read directly, thereby eliminating the computations described.

I claim:

1. In a testing device, a frame, a pendulum mounted to rotate thereon, said pendulum being calibrated, a clamp attached to said pendulum, a second clamp attached to said frame and adapted to cooperate with said first clamp to hold material to be tested, and a pointer frictionally mounted on the hub of said pendulum and cooperating with said pendulum to measure the work done in tearing the material.

2. In a testing device, a frame, a pendulum mounted to rotate thereon, said pendulum being calibrated, a clamp attached to said pendulum, a second clamp attached to said frame and adapted to cooperate with said first clamp to hold material to be tested, and a balanced pointer frictionally mounted on the hub of said pendulum and cooperating with said pendulum to measure the work done in tearing the material.

3. In a testing device, a frame, a pendulum mounted to rotate thereon, said pendulum being calibrated, a clamp attached to said pendulum, a second clamp attached to said frame and adapted to cooperate with said first clamp to hold material to be tested, means cooperating with said pendulum to measure the work done in tearing the material, and means to hold said pendulum in position to attach the specimen to be tested and to release said pendulum from its held position.

4. In a testing device, a frame, a pendulum mounted to rotate thereon, said pendulum being calibrated, a clamp attached to said pendulum, a second clamp attached to said frame and adapted to cooperate with said first clamp to hold material to be tested, means cooperating with said pendulum to measure the work done in tearing the material, and spring means to hold said pendulum in position to attach the specimen to be tested and to release said pendulum from its held position.

5. In a tearing tester, a frame, a pendulum mounted to rotate thereon, said pendulum being calibrated, a clamp attached to said pendulum, a second clamp attached to said frame and adapted to cooperate with said first clamp to hold the material to be tested, and means cooperating with said pendulum to measure the work done in tearing the material, and means to hold said pendulum in position to attach the specimen to be tested, to release said pendulum from its held position, whereby it swings to tear said material, and to bring said pendulum to a stop after it has swung.

6. In a testing device, a frame, a pendulum mounted to rotate thereon, said pendulum being calibrated, a clamp attached to said pendulum, a second clamp attached to said frame and adapted to cooperate with said first clamp to hold material to be tested, a pointer frictionally mounted on the hub of said pendulum and cooperating with said pendulum to measure the work done in tearing the material, and means to set said pointer at zero on said pendulum.

In testimony whereof I affix my signature.

ARMIN ELMENDORF.